US012639133B2

(12) United States Patent
Mouring, Jr. et al.

(10) Patent No.: US 12,639,133 B2
(45) Date of Patent: May 26, 2026

(54) CLOUD ENVIRONMENT MIGRATION SYSTEM

(71) Applicant: Sequoia Holdings, LLC, Reston, VA (US)

(72) Inventors: Stephen Earl Mouring, Jr., Culpeper, VA (US); Andrew Jonathan Anderson, Gainesville, VA (US)

(73) Assignee: Sequoia Holdings, LLC, Reston, VA (US)

( * ) Notice: Subject to any disclaimer, the term of this patent is extended or adjusted under 35 U.S.C. 154(b) by 580 days.

(21) Appl. No.: 18/111,211

(22) Filed: Feb. 17, 2023

(65) Prior Publication Data

US 2023/0267014 A1     Aug. 24, 2023

Related U.S. Application Data

(60) Provisional application No. 63/311,464, filed on Feb. 18, 2022.

(51) Int. Cl.
*G06F 9/46*          (2006.01)
*G06F 9/50*          (2006.01)

(52) U.S. Cl.
CPC ................................. *G06F 9/5088* (2013.01)

(58) Field of Classification Search
CPC ...................................................... G06F 9/5088
See application file for complete search history.

(56) References Cited

U.S. PATENT DOCUMENTS

| | | |
|---|---|---|
| 2009/0288083 A1 | 11/2009 | Ciano et al. |
| 2014/0278808 A1 | 9/2014 | Iyoob et al. |
| 2014/0359129 A1 | 12/2014 | Sharma et al. |
| 2019/0391855 A1 | 12/2019 | Bernat et al. |

OTHER PUBLICATIONS https://info.missioncloud.com/hubfs/Mission%20-%20Downloadables/ Mission_Cloud_Provider_Comparison_Chart.pdf, Mission™ Cloud Services, "Cloud Provider Comparison Chart," pp. 1-10, retrieved on Feb. 16, 2023.
https://www.cloudquery.io/, CloudQuery, Inc., "An open source high performance data integration platform for developers," retrieved on Feb. 16, 2023.
https://cloudcheckr.com/, CloudCheckr, Inc, Total Visibility Cloud Management Platform, retrieved on Feb. 16, 2023.

(Continued)

*Primary Examiner* — Gregory A Kessler
(74) *Attorney, Agent, or Firm* — DLA Piper LLP (US)

(57) ABSTRACT

A migration manager is deployed within a current cloud environment associated with an enterprise. The migration manager receives a request to generate a migration plan for migrating resources associated with the current cloud environment to a target cloud environment. The migration manager generates a list of resources utilized by the enterprise in the current cloud environment. The migration manager augments the list of resources with metadata comprising a set of descriptive tags generated by the migration manager. The set of descriptive tags indicates a capability associated with a given resource. The migration manager compares the augmented list of resources to a set of known capabilities associated with the target cloud environment. Based on the comparing, the migration manager generates the migration plan for migrating the resources from the current cloud environment to the target cloud environment.

20 Claims, 8 Drawing Sheets

(56)        References Cited

OTHER PUBLICATIONS https://www.cloudcomparisontool.com/, Public Cloud Services Comparison Tool, retrieved on Feb. 16, 2023.
https://www.jamcracker.com/cloud-cost-comparisons, Jamcracker, Inc., Cloud Cost Comparisons, retrieved on Feb. 16, 2023.
International Preliminary Report on Patentability dated Aug. 29, 2024, from corresponding International Application No. PCT/US2023/013325.
International Search Report and Written Opinion dated May 3, 2023, from corresponding International Application No. PCT/US2023/013325.
Extended European Search Report dated Feb. 12, 2026 from corresponding European Application No. 23756917.3.

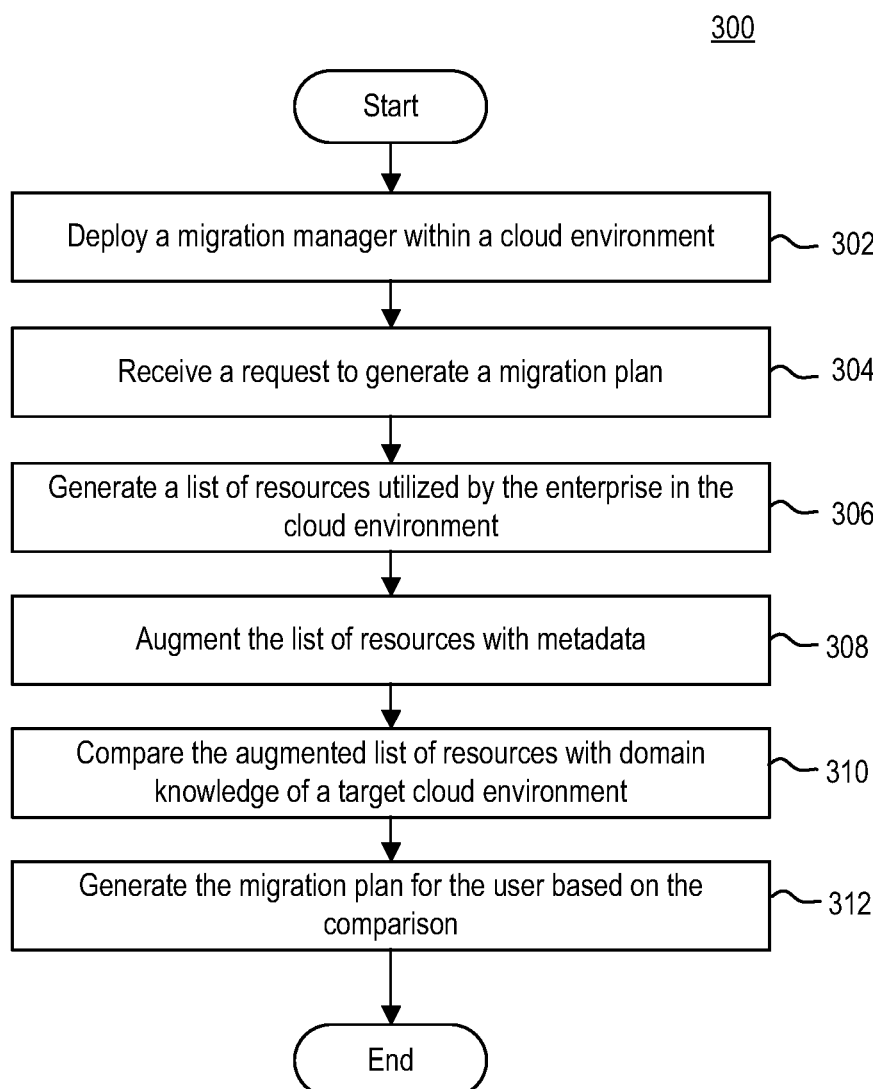

300

Start

Deploy a migration manager within a cloud environment — 302

Receive a request to generate a migration plan — 304

Generate a list of resources utilized by the enterprise in the cloud environment — 306

Augment the list of resources with metadata — 308

Compare the augmented list of resources with domain knowledge of a target cloud environment — 310

Generate the migration plan for the user based on the comparison — 312

End

| SILVERSTON COLLABORTIVE SOLUTIONS | | | | |
|---|---|---|---|---|
| DASHBOARD | | | | |
| LATEST ASSESSMENTS | | | | ⊕ |
| NAME | SOURCE | TARGET | DATE | RISK |
| OCI TO AWS | ☁ | aws | 12/10/21, 10:17 AM | ● |
| AZURE TO OCI | △Azure | ☁ | 12/10/21, 10:16 AM | ● |
| AWS TO AZURE | aws | △Azure | 9/21/21, 7:08 PM | ○ |

| SILVERSTON COLLABORTIVE SOLUTIONS |
|---|

DASHBOARD/ASSESSMENTS/1

| AWS TO AZURE | ⊘⊕ | aws → △Azure |
|---|---|---|

| LATEST TO SNAPSHOT view details | ⊕ |
|---|---|

| LOW Risk | 12/13/21, 9:00 PM Snapshot taken |
|---|---|

| 84 Resources | 81 Low Risk | 0 Medium Risk | 3 High Risk |
|---|---|---|---|

ALL SNAPSHOTS

| DATE | RESOURCES | STATUS | RISK |
|---|---|---|---|
| 12/13/21, 9:00 PM | 84 | FINISHED | ○ |
| 12/13/21, 2:37 PM | 43 | FINISHED | ● |
| 12/9/21, 9:11 PM | 79 | FINISHED | ● |
| 12/9/21, 9:00 PM | 0 | FINISHED | ● |
| 12/9/21, 8:58 PM | 0 | FAILED | ● |
| 12/9/21, 8:56 PM | 0 | FAILED | ● |

SILVERSTON COLLABORTIVE SOLUTIONS

DASHBOARD/ASSESSMENTS/1/SNAPSHOTS/34

SNAPSHOT INFO

| LOW Risk | 12/13/21, 9:00 PM Snapshot taken |
|---|---|

| 84 Resources | 81 Low Risk | 0 Medium Risk | 3 High Risk |
|---|---|---|---|

TOP RECOMMENDATIONS view all assets

| COUNT | DESCRIPTION | Risk |
|---|---|---|
| 15 | In AWS, NACLs apply at the subnet level SGs on the instances (ENIs). ENIs support multiple SGs. | ○ |
| 10 | Azure VNet subnets have individual routing tables. | ○ |
| 5 | AWS can only support one AZ per NIC. Azure supports multiple AZs per NIC. | ⊘ |

SERVICES IN SNAPSHOT

| EC2 | RDS | VPC | ROUTE 53 | SNS |
|---|---|---|---|---|

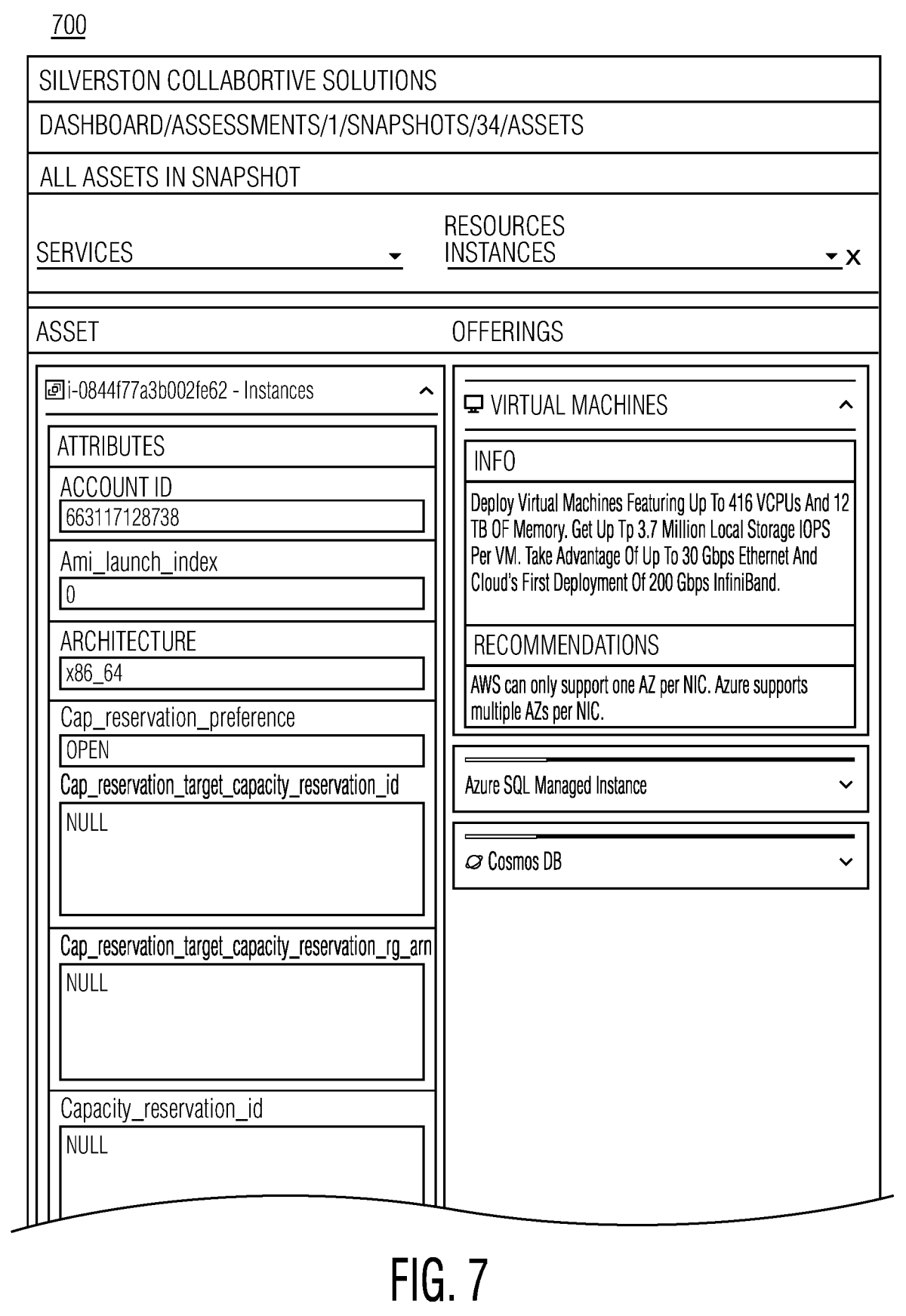

SILVERSTON COLLABORTIVE SOLUTIONS

DASHBOARD/ASSESSMENTS/1/SNAPSHOTS/34/ASSETS

ALL ASSETS IN SNAPSHOT

SERVICES ▼

RESOURCES
INSTANCES ▼ X

ASSET                   OFFERINGS

▣ i-0844f77a3b002fe62 - Instances ⌃

ATTRIBUTES

ACCOUNT ID
663117128738

Ami_launch_index
0

ARCHITECTURE
x86_64

Cap_reservation_preference
OPEN

Cap_reservation_target_capacity_reservation_id
NULL

Cap_reservation_target_capacity_reservation_rg_arn
NULL

Capacity_reservation_id
NULL

---

🖵 VIRTUAL MACHINES ⌃

INFO

Deploy Virtual Machines Featuring Up To 416 VCPUs And 12 TB OF Memory. Get Up Tp 3.7 Million Local Storage IOPS Per VM. Take Advantage Of Up To 30 Gbps Ethernet And Cloud's First Deployment Of 200 Gbps InfiniBand.

RECOMMENDATIONS

AWS can only support one AZ per NIC. Azure supports multiple AZs per NIC.

Azure SQL Managed Instance ⌄

🪐 Cosmos DB ⌄

FIG. 7

FIG. 8A     800
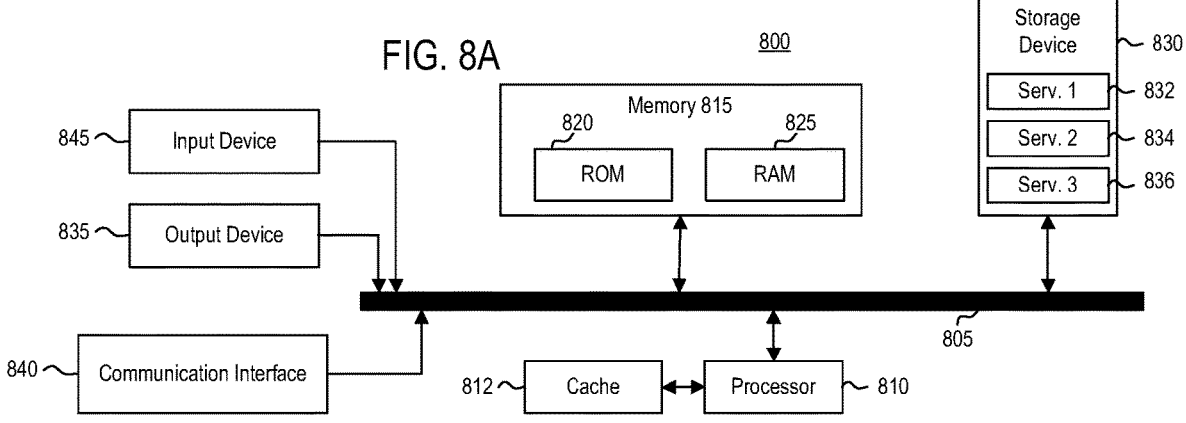
FIG. 8B     850
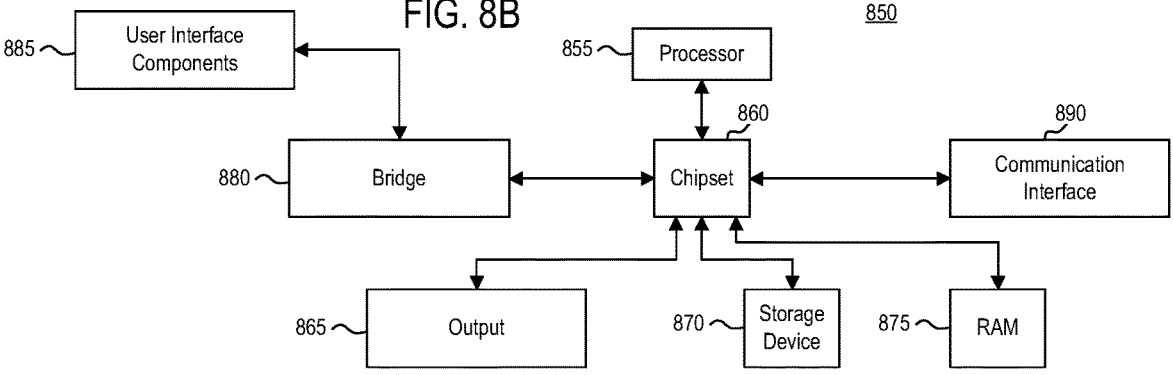

CLOUD ENVIRONMENT MIGRATION SYSTEM

FIELD OF THE DISCLOSURE

The present disclosure generally relates to a system for generating a migration plan and risk profile for migrating resources from a current cloud environment to one of multiple target cloud environments.

BACKGROUND

Cloud software is a huge market that continually grows with more and more software developers moving their solutions into cloud computing platforms. The Department of Defense (DoD) and other organizations have also joined the trend, identifying its multiple advantages, and have started to use secured and classified cloud regions, such as C2S and SC2S provided by Amazon AWS, and Azure Secret (with Azure Top Secret coming) provided by Microsoft.

SUMMARY

In some embodiments, the techniques described herein relate to a method including: deploying a migration manager within a current cloud environment associated with an enterprise; receiving, by the migration manager, a request to generate a migration plan for migrating resources associated with the current cloud environment to a target cloud environment; generating, by the migration manager, a list of resources utilized by the enterprise in the current cloud environment; augmenting, by the migration manager, the list of resources with metadata including a set of descriptive tags generated by the migration manager, the set of descriptive tags indicating a capability associated with a given resource; comparing, by the migration manager, the augmented list of resources to a set of known capabilities associated with the target cloud environment; and based on the comparing, generating, by the migration manager, the migration plan for migrating the resources from the current cloud environment to the target cloud environment, the migration plan including a cost, risk, and/or effort for migrating each resource to the target cloud environment.

In some embodiments, the techniques described herein relate to a system, including: a processor; and a memory having programming instructions stored thereon, which, when executed by the processor, causes the system to perform operations including: deploying a migration manager within a current cloud environment associated with an enterprise; receiving, by the migration manager, a request to generate a migration plan for migrating resources associated with the current cloud environment to a target cloud environment; generating, by the migration manager, a list of resources utilized by the enterprise in the current cloud environment; augmenting, by the migration manager, the list of resources with metadata including a set of descriptive tags generated by the migration manager, the set of descriptive tags indicating a capability associated with a given resource; comparing, by the migration manager, the augmented list of resources to a set of known capabilities associated with the target cloud environment; and based on the comparing, generating, by the migration manager, the migration plan for migrating the resources from the current cloud environment to the target cloud environment, the migration plan including a cost, risk, and/or effort for migrating each resource to the target cloud environment.

In some embodiments, the techniques described herein relate to a non-transitory computer readable medium including one or more sequences of instructions, which, when executed by one or more processors, causes a computing system to perform operations including: deploying a migration manager within a current cloud environment associated with an enterprise; receiving, by the migration manager, a request to generate a migration plan for migrating resources associated with the current cloud environment to a target cloud environment; generating, by the migration manager, a list of resources utilized by the enterprise in the current cloud environment; augmenting, by the migration manager, the list of resources with metadata including a set of descriptive tags generated by the migration manager, the set of descriptive tags indicating a capability associated with a given resource; comparing, by the migration manager, the augmented list of resources to a set of known capabilities associated with the target cloud environment; and based on the comparing, generating, by the migration manager, the migration plan for migrating the resources from the current cloud environment to the target cloud environment, the migration plan including a cost, risk, and/or effort for migrating each resource to the target cloud environment.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a flow diagram illustrating a method of generating a migration plan, according to example embodiments.

FIG. 4 illustrates an example graphical user interface, according to example embodiments.

FIG. 5 illustrates an example graphical user interface, according to example embodiments.

FIG. 6 illustrates an example graphical user interface, according to example embodiments.

FIG. 7 illustrates an example graphical user interface, according to example embodiments.

FIG. 8A illustrates an architecture of a computing system, according to example embodiments.

FIG. 8B illustrates a chipset architecture of a computing system, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
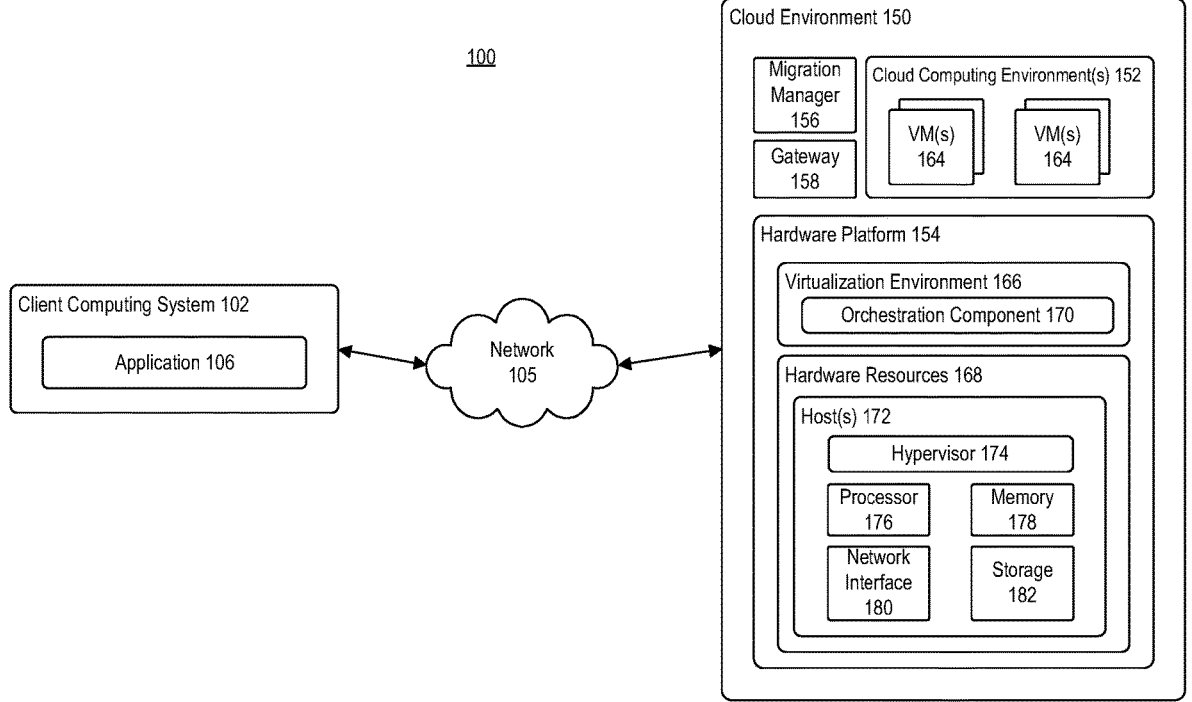
FIG. 1 is a block diagram illustrating a computing environment, according to example embodiments.

Transition between a classified cloud region and a commercial cloud region is a relatively new problem set. While there is existing technology to transition between on premises data centers and the cloud data centers, as well as to emulate classified cloud regions in a commercial cloud region, there is, however, no existing technology to automatically analyze the level of effort or level of risk in migrating a workload up to or between classified cloud regions. Classified cloud emulators can assist with the actual migration in some cases but cannot provide the intelligence up front to determine if such a migration is possible or desirable.

There, generally, is considerable difficulty in planning a migration from a commercial cloud region to classified cloud regions. Not only are migrations difficult and require considerable cloud engineering knowledge, as well as knowledge of the system being migrated, but there are also additional complications for classified cloud regions. This may be attributed to classified cloud regions having different technical characteristics from their commercial counterparts, which results in existing cloud migration tools and practices not always being applicable. In addition, government customers often operate under additional security and policy restrictions, which are nuanced between customers and even individual projects. Therefore, planning a migration therefore becomes a manual and highly specialized task.

Automating the migration analysis is highly desirable functionality. However, such process of automating the migration analysis is not a trivial process, and has two fundamental problems to overcome.

First, each cloud workload typically uses different capabilities from a given cloud environment. For example, one workload might use only a few cloud services such as virtual compute, block storage, and key-value storage, whereas another workload might use many complex managed services such as managed Kubernetes, queues and publishers, serverless functions, and artificial intelligence stream analytics engines. As those skilled in the art recognize, it is challenging to accurately automate the identification of all of these used capabilities at a granular enough level to plan a meaningful migration. Such analysis requires a deep evaluation of the architecture and the capabilities a workload is leveraging.

Second, each classified cloud region has a different set of capabilities that it supports, which often significantly differs from its commercial equivalent. This set of capabilities is further complicated by the fact that each government agency or group using the classified cloud might have additional institutional rules around what cloud capabilities are to be used by its projects. The security accreditation at each government agency or group can also dictate what capabilities are eligible for different projects based on characteristics of a given project. Together this means that it is very difficult to accurately map capabilities of a classified cloud region and compare the capabilities between two classified cloud regions.

To account for this, one or more techniques described herein provide a system that is able to analyze an existing cloud region workload and automatically derive a migration path and risk profile from a first cloud environment to a target cloud environment. In some embodiments, a target cloud environment may be defined as a cloud platform from which a workload cannot be programmatically transferred. Thus, for example, the many regions (us-east-1, us-west-1, etc.) of AWS Commercial together comprise one target environment (because programmatic migration between regions is trivial), whereas AWS GovCloud would be considered a different target environment because one cannot programmatically transfer workloads to it from AWS Commercial.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

FIG. 1 is a block diagram illustrating a computing environment 100, according to example embodiments. Computing environment 100 may include client computing system 102, and cloud environment 150 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of computing environment 100.

Client computing system 102 may be associated with a client or customer associated with a cloud provider associated with cloud environment 150. For example, client computing system 102 may represent an enterprise or organization that utilizes cloud resources provided and/or managed by cloud environment 150. Client computing system 102 may include at least application 106. Application 106 may be representative of a web browser or application that allows a user of client computing system 102 to access resources hosted in cloud environment 150.

Cloud environment 150 may be operated by a cloud computing service provider. In some embodiments, cloud environment 150 may refer to an originating cloud computing environment. For example, cloud environment 150 may be a cloud environment that currently hosts an enterprise's resources. In some embodiments, cloud environment 150 may refer to a public or hybrid cloud environment. In some embodiments, cloud environment 150 may refer to private or secure cloud computing environments, such as, but not limited to, C2S and SC2S provided by Amazon AWS and Azure Secret (with Azure Top Secret coming) provided by Microsoft.

Cloud environment 150 may be configured to dynamically provide an enterprise with one or more cloud computing environments 152 in which a user may provision virtual machines (VMs) 152, deploy multi-tier applications on VMs 164, and/or execute workloads. Cloud environment 150 may include a hardware platform 154 upon which cloud computing environments 152 may be executed.

As illustrated, hardware platform 154 may include hardware resources 168, storage resources, and/or networking resources, which may be configured in a manner to provide a virtualization environment 166 that supports the execution of a plurality of VMs 164 across a plurality of hosts (e.g., hosts 172). In some embodiments, hardware resources 168 of cloud environment 150 may be distributed across multiple data centers in different locations.

Hardware resources 168 may include one or more hosts 172. Each host 172 may include one or more processors 176, memory 178, network interface 180, and storage 182. Processor 176 may be configured to execute instructions, for example, executable instructions that perform one or more operations described herein and may be stored in memory 178 and/or storage 182. Memory 178 may be representative of a device that allows information, such as executable instructions, virtual disks, configurations, and other data, to be stored and retrieved. Memory 178 may include, for example, one or more random access memory (RAM) modules. Network interface 180 may enable a host 172 to communicate with another device via a communication medium, such as network 105. Network interface 180 may include one or more network adapters, also referred to as a network interface card (NIC). Storage 182 may be representative of local storage devices (e.g., one or more hard disks, flash memory modules, solid state disks, optical disks, etc.) and/or a storage interface that enables host 172 to communicate with one or more network data storage systems.

Each host 172 may be configured to provide a virtualization layer that abstracts processor, memory, storage, and networking resources of hardware platform 154 into multiple VMs 164 that run concurrently on the same hosts. VMs 164 may run on top of a software interface layer, referred to herein as a hypervisor 174, that enables sharing of the hardware resources of host 172 by VMs 164. One example of hypervisor 174 that may be used in an embodiment described herein is Hyper-V® hypervisor provided as part of Microsoft® Azure® cloud computing service or Nitro hypervisor as part of AWS. In some embodiments, hypervisor 174 may execute on top of the operating system of a given host 172. In some embodiments, hypervisor 174 may execute directly on hardware components of host 172.

Each cloud computing environment 152 may be associated with a particular tenant of cloud environment 150, such as an enterprise associated with client computing system 102. In some embodiments, cloud environment 150 may be configured as a dedicated cloud service for a single tenant comprised of dedicated hardware resources. In some embodiments, cloud environment 152 may be configured as part of a multi-tenant cloud service with logically isolated virtualized computing resources on a shared physical infrastructure.

In some embodiments, virtualization environment 166 may include an orchestration component 170. Orchestration component 170 may provide infrastructure resources to cloud environment 150 responsive to provisioning requests. For example, if an enterprise required a specific number of virtual machines to deploy a web application or to modify a currently running web application to support peak demands, orchestration component 170 may initiate and manage the instantiation of VMs 164 on hosts 172 to support such request.

Cloud environment 150 may further include gateway 158. Gateway 158 may be configured to provide VMs 164 and other components in cloud environment 150 with connectivity to external network 105 (e.g., Internet). Gateway 158 may manage external public IP addresses for cloud environment 150 and one or more private internal networks interconnecting VMs 164. Gateway 158 may be configured to route traffic incoming to and outgoing from cloud environment 150 and provide networking services.

Cloud environment 150 may further include migration manager 156. In some embodiments, migration manager 156 may be configured within cloud environment 150 by user of client computing system 102. For example, a user of client computing system 102 may deploy migration manager 156 within cloud environment 150. In some embodiments, deploying migration manager 156 within cloud environment 150 may include granting migration manager 156 appropriate rights, such that migration manager 156 can monitor and access resources associated with the enterprise.

Migration manager 156 may be configured to analyze an enterprise's workload within cloud environment 150 and derive a migration plan for migrating the enterprise's workload from cloud environment 150 to another cloud environment. In some embodiments, migration manager 156 may analyze the enterprise's workload to develop a migration plan from a non-classified cloud region (e.g., Azure public) to a classified cloud region (e.g., Azure Government Secret). In some embodiments, migration manager 156 may analyze the enterprise's workload to develop a migration plan between classified cloud regions of the same or different classification levels (e.g., AWS C2S to AWS SC2S).

Conventionally, there is a relatively new challenge of transitioning between a classified cloud region and a commercial cloud region when developing software and applications. There currently is not a solution for automatically determining a level of effort or level of risk in migrating a workload up to and among classified clouds in the unique constraints of the classified cloud ecosystem. The current disclosure solves this challenge by developing migration manager 156, which is specially configured to analyze the enterprise's existing cloud region (e.g., within cloud environment 150) and derive a migration path and risk profile for migrating the enterprise's workload to a different cloud environment (e.g., low-to-high or lateral cloud-to-cloud migration). Using a specific example, migration manager 156 may analyze an enterprise's workload in a classified cloud region, such as SC2S in AWS to develop a lateral migration plan to Azure Secret.

To generate the migration plan, migration manager 156 may be configured to infer cloud capabilities of the existing cloud computing environment (e.g., cloud environment 150) and interpolate a migration path between the existing cloud computing environment and the target cloud computing environment based on the inferred cloud capabilities in accordance with the varying capabilities between the two cloud computing environments.

Infer Cloud Capabilities

Every cloud provider has a menu of unique services that operates within their cloud environment. Each of these services may provide one or more capabilities to end users. For example, AWS includes Elastic Compute Cloud (EC2) to provide users with access to virtual machines. Similarly, Azure includes Azure VM, which also provides users with access to virtual machines. While on the surface EC2 and Azure VM appear similar, each of these services has a much more granular set of capabilities.

In one example, EC2 is configured to support both Windows or Linux virtual machines of varying sizes in multiple dimensions (compute, storage, networking, and memory). Virtual machines can be scheduled, on demand or reserved. The EC2 virtual machines can be sourced from a pre-provided image, a custom image, or an image generated on-demand. Azure VMs on the other hand, have different size allocations for its virtual machines compared to EC2. Azure VM also does not allow users to schedule instances. Unlike EC2, however, Azure allows instances to be moved between subnets without recreating the instance. Thus, despite having similar capabilities, the services offered by AWS and Azure differ substantially on a granular level. These differing cloud capabilities drive the level of effort in migrating between cloud environments. This is because it is not enough to simply catalog what services the enterprise uses; instead, it is important to understand the capabilities of each service.

For some cloud providers there is a direct correlation between cloud capabilities. For example, AWS includes elastic networking interfaces to associate internet protocol (IP) addresses with virtual servers; similarly, Azure includes a matching virtual interface capability that provides the exact same functionality. For those cases where there is not a direct correlation, there may be workarounds or alternate migration paths each with varying levels of effort.

Workloads have two distinct phases in which they leverage cloud capabilities: deployment and execution. A given workload might leverage certain cloud capabilities one time or intermittently to successfully deploy. A different set of capabilities may be needed to successfully execute the workload after deployment. Accordingly, in order to accurately plan a migration path between cloud environments, migration manager 156 needs to understand the capabilities a workload relies upon during both the deployment and execution phase. Unfortunately determining this information is not trivial. It requires multiple dimensions of data to be inspected and interpolated. Existing workloads in particular represent a unique challenge since, once their deployment has already occurred, it is hard to determine what cloud capabilities were needed at deployment time.

To account for this, migration manager 156 may be deployed within cloud environment 150 to automatically ingest data from a variety of data sources with a priority given to data sources natively available in the cloud account (those requiring no human intervention). Migration manager 156 may generate a full picture of the cloud capabilities an enterprise uses by proactively making requests and passively monitoring existing data sources. For example, within AWS, migration manager 156 may consume AWS CloudTrail logs to observe AWS API calls being made during a workload's execution. In some embodiments, migration manager 156 may interrogate the AWS CloudFormation service to determine if any CloudFormation templates were used to deploy the workload, and, if so, what resources were created. In some embodiments, migration manager 156 may utilize AWS Config to collect the state of all resources deployed and assess the state data continuously. Migration manager 156 may then proactively scan for existing resources and configurations to resolve any ambiguities and fill in any missing data.

In some embodiments, for each cloud capability, migration manager 156 may produce a signature (e.g., a set of indicative API calls, a specific configuration set, a specific set of resources, etc.) that may be matched against available data. If a signature matches, then that cloud capability is marked as used by the workload.

While these data sources can be derived without human intervention, should human intervention be possible and desirable, the quality of the inferred data can be further enhanced. For example, a user of client computing system 102 could triage which cloud resources are part of the workload and which are not or identify subsets of resources to consider. In another example, a user of client computing system 102 could resolve any cases of ambiguity where migration manager 156 may be unable to determine if a given capability is in use or not via signature logs. In another example, a user of client computing system 102 may prioritize the cloud capabilities by indicating which cloud capabilities are from essential components of the workload and which are from optional parts of the workload.

By using signature-based identification of cloud capabilities combined with automated discovery and ingestion of data, migration manager 156 may be able to infer what cloud capabilities are in use and build a list of cloud capabilities for determining the migration path.

Interpolating Migration Path

After migration manager 156 determines the list of cloud capabilities in the current cloud environment (e.g., cloud environment 150), migration manager 156 may then determine a realistic migration path by comparing the list of cloud capabilities in the current cloud environment to the capabilities in a target cloud environment and accounting for gaps, should they appear.

As provided above, each major cloud provider (e.g., Amazon AWS, Microsoft Azure, Google Cloud, etc.) has built or is building multiple disconnected versions of their cloud platforms to serve different customer bases. For example, AWS has AWS Commercial, which is globally available, but they also provide AWS GovCloud for United States government customers only, AWS SC2S for Secret classified workloads and AWS C2S for Top Secret classified workloads. In each case, each of these different versions is physically disconnected from each other and each includes a different set of cloud capabilities available to its users.

Migration manager 156 may be configured to build a matrix of cloud capabilities for target environments. Such a process may require domain knowledge and working access to each cloud environment. For each cell of the matrix, the target environment should be designated as: possessing the capability; having a workaround for the capability; or having no workaround for the capability. In some embodiments, each cell of the matrix may be further qualified based on other factors, such as Government agency or security overlay. The additional qualification may be used to reflect that, even though a target environment could provide a capability, it might be unavailable to certain workloads.

After migration manager 156 develops this matrix, migration manager 156 may compare the list of capabilities from a workload in the original cloud environment to the matrix to determine whether the workload is compatible with the target cloud environment. Migration manager 156 may develop a migration path for each cell of the matrix. For example, in the user-case of migrating from AWS to Azure, if the cloud capability of binary storage is required, then migration manager 156 may generate, as output, "migrate binary storage to Azure Blob Storage table."

In some embodiments, migration manager 156 may determine that there is not a direct correlation between cloud capabilities of the originating cloud environment to the target cloud environment. In such circumstances, migration manager 156 may determine whether there is a workaround. For cells or capabilities that have workarounds, migration manager 156 may further assign a difficulty weight to the workaround. The difficulty weight may provide an indication to the user regarding the difficulty of achieving the same functionality in the target cloud environment. In some embodiments, the difficulty weight may be multi-dimensional.

By leveraging the matrix of cloud capabilities, migration manager 156 may generate migration plans from one cloud environment to another, and indicate the associated difficulty/level of effort in performing such migration. Such granularity of assessment combined with the mostly automated determination of cloud capabilities provides a solution to customers who are looking to assess the risk of migrations up to and among classified cloud environments.

Figure 2:
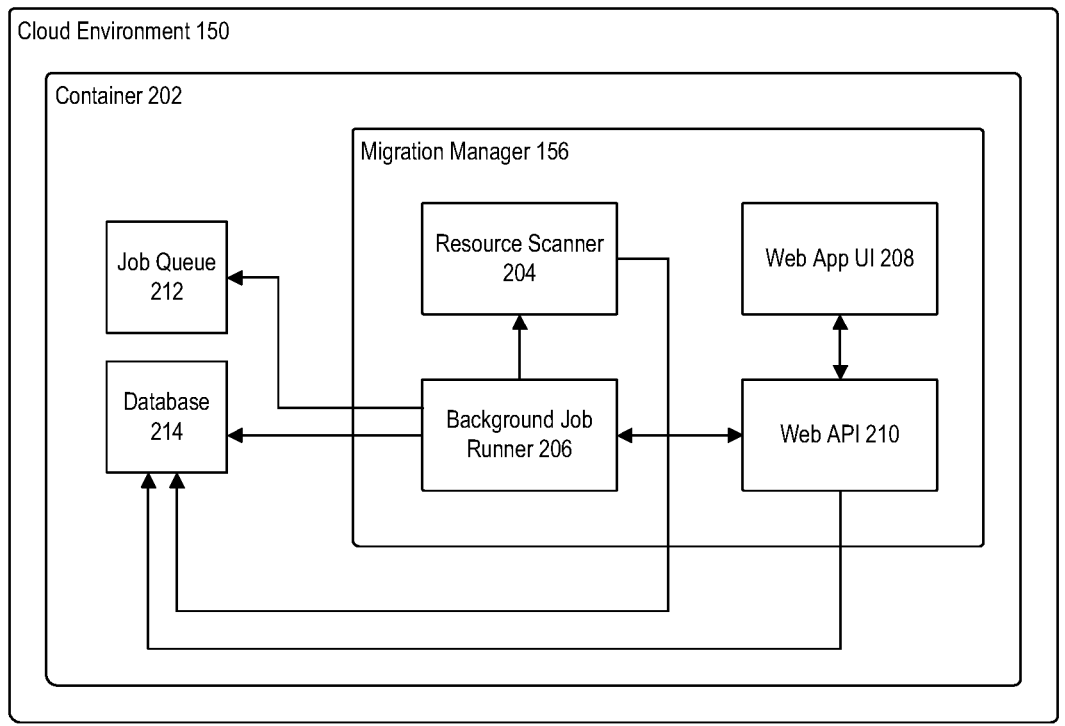
FIG. 2 is a block diagram illustrating a migration manager, according to example embodiments.

FIG. 2 is a block diagram illustrating migration manager 156, according to example embodiments. As shown, migration manager 156 may be deployed within a virtualization element in cloud environment 150. In some embodiments, migration manager 156 may be deployed in container 202 (e.g., a Docker container).

Container 202 may be provisioned using a pre-generated image developed by an entity associated with a third party computing system. For example, container 202 may be provisioned using a container image that includes at least migration manager 156, job queue 212, and database 214.

As shown, migration manager 156 may include resource scanner 204, background job runner 206, web application user interface ("web app UI") 208, and web application programming interface (API) 210.

Web app UI 208 may be generated by migration manager 156 and provided to user via application 106. Via web app UI 208, a user of client computing system 102 may request a new environment snapshot of the enterprise's resources in cloud environment 150. Web app UI 208 may forward the request to web API 210.

Web API 208 may be configured to receive snapshot requests from web app UI 208 and initiate the migration analysis process. In some embodiments, web API 210 may initialize the migration analysis process by creating a new snapshot request record. Web API 210 may add the new snapshot request record to database 214. Web API 210 may further insert a new job to create the new snapshot record to job queue 208.

Background job runner 206 may be configured to monitor job queue 212 for new job requests. When a job for a new snapshot record is identified, background job runner 206 may facilitate the migration analysis process. For example, background job runner 206 may instruct, prompt, or activate resource scanner 204. Resource scanner 204 may be configured to capture the enterprise's current asset information through a process of calling the cloud provider's available APIs and requesting information on the resources in use. The resource scanner 204 may then store the retrieved information into a database for use by the background job runner 206.

Background job runner 206 may assign each resource a set of descriptive tags to indicate the type of resource, usage, and limitations inherent to that resource. For example, background job runner 206 may analyze each resource in the list of resources to determine capabilities of the current cloud environment that the user utilizes. Based on the determined capabilities and identified resources, background job runner 206 may generate the set of descriptive tags for each resource. Background job runner 206 may utilize these tags for comparison of the current cloud environment to a target cloud environment at multiple levels of the service offerings (e.g., from individual resources to overall cloud provider). These tags may be representative of keywords manually chosen from resource descriptions, published capability sets, and common offering descriptive terms. Once the overall set of tags are generated, individual tags may be set on each resource type by the developers. Once set, users may be granted permission to manage the tags.

Background job runner 206 may determine a risk of migrating to a target cloud environment or multiple possible target cloud environments by performing a risk calculation using an algorithm based on the Jaccard similarity coefficient. The algorithm may calculate the similarity between two resources using a set of tags on each resource. For example, the algorithm may start with a fixed set of tags. Using the fixed set of tags, the algorithm may calculate the difference between the fixed set of tags and a secondary set of tags (i.e., target resources from a target environment). The algorithm may return a value, which may be used to filter and eliminate resources from the target environment. In some embodiments, the algorithm may be weighted based on user input. For example, a user may define a priority for the risk calculation. The priority may be selected from a group that includes a cost, effort, and risk. For example, if the cost priority is set, a lower cost offering that requires a higher migration effort will be ranked at a higher similarity than an offering with a lower migration effort but higher cost. The set of tags assigned to the resources and targets may include weight descriptors in the priority options, indicating that a particular tag may be more weighted for low effort or low cost. Weights may be applied to cost, effort, and risk variables in the algorithm to tailor the recommendation to the requesting user, based on that user's or enterprise's priorities.

Based on output from the comparison, background job runner 206 may generate the snapshot or report for the user. For example, for each capability for which there is an equivalent in the target cloud environment, background job runner 206 may notify the user or enterprise of the equivalent capability in the target cloud environment. For each capability for which there are differences in the target environment, background job runner 206 may be configured to identify a workaround for achieving similar functionality in the target environment. For each capability for which there is no workaround, background job runner 206 may notify the user or enterprise that those capabilities or resources are not able to migrate from the current cloud environment to the target cloud environment.

Background job runner 206 may store the snapshot in database 214. Once in database 214, web API 210 may pull the snapshot from database 214 for presentation to the user via web app UI 208.

FIG. 3 is a flow diagram illustrating a method 300 of generating a migration plan, according to example embodiments. Method 300 may begin at step 302.

At step 302, migration manager 156 may be deployed within cloud environment 150. In some embodiments, deploying migration manager 156 in cloud environment 150 may include provisioning a container in cloud environment 150 using container-functionality native to cloud environment 150. The application code for migration manager 156 may be deployed inside a custom container that includes, for example, job queue 212 and database 214. In some embodiments, deploying migration manager 156 may include assigning a public IP address and DNS name to the container, which may allow access to the web interface.

In some embodiments, deploying migration manager 156 may include granting migration manager 156 access to resources within cloud environment 150. For example, credentials with appropriate read access rights may be assigned to migration manager 156 to enable resource or asset information retrieval. In this manner, when migration manager 156 scans the enterprise's resources, migration manager 156 can connect to the enterprise's resource or asset information APIs using the assigned credentials.

At step 304, migration manager 156 may receive a request from a user to generate a migration plan. In some embodiments, the request may include information about the target cloud environment. For example, the user may specify a target cloud environment that the user or enterprise intends to utilize. In some embodiments, the request may be cloud agnostic. For example, the user or enterprise may not specify a target cloud environment, but is instead looking for information across multiple cloud environments to determine which cloud environment is best suited for its workload. In some embodiments, the request may further include preference information for the user. For example, the user may indicate that one of the following variables are most important to their decision-making: cost of the migration, effort of the migration, and risk of the migration. Such input or preference may assist migration manager 156 in developing a migration strategy that is suitable for the enterprise.

At step 306, migration manager 156 may generate a list of resources utilized by the enterprise in the current cloud environment. For example, resource scanner 204 may scan the enterprise's current resource information in cloud environment 150. In some embodiments, to scan the enterprise's current resource information, resource scanner 204 may communicate with available cloud provider APIs to retrieve information related to the current cloud environment 150. Resource scanner 204 may generate a list of resources associated with the enterprise's current cloud environment. In some embodiments, resource scanner 204 may use an open source tool, such as cloudquery. Such tool may be activated as part of resource scanner 204. Cloudquery may create an inventory of resources and assets in use in the current cloud environment by calling public APIs and storing the resulting information into a database.

At step 308, migration manager 156 may augment the list of resources with metadata. In some embodiments, the metadata may be representative of a set of descriptive tags generated by migration manager 156 that indicate the type of resource, usage, and limitations inherent to that resource. For example, background job runner 206 may analyze each resource in the list of resources to determine capabilities of the current cloud environment that the enterprise utilizes. Based on the determined capabilities and identified resources, migration manager 156 may generate the set of descriptive tags for each resource. The tags may be utilized downstream for comparison of the current cloud environment to a target cloud environment at multiple levels of the service offerings (e.g., from individual resources to overall cloud provider).

At step 310, migration manager 156 may compare the augmented list of resources with domain knowledge of target cloud environments. For example, migration manager 156 may have access to a matrix of resources and capabilities for each possible target cloud environment. Migration manager 156 may compare the augmented list of resources to the matrix of resources and capabilities for each possible target cloud environment to determine an optimal or best target cloud computing environment for the enterprise. Migration manager 156 may utilize an algorithm based on the Jaccard similarity coefficient for the comparison. The algorithm may calculate the similarity between two resources using a set of tags on each resource. Using the augmented list of resources, the algorithm may calculate the difference between the tags in the augmented list of resources and a secondary set of tags (i.e., target resources from a target environment). The algorithm may return a value, which may be used to filter and eliminate resources from the target environment. In some embodiments, the algorithm may be weighted based on the user input received above, i.e., one of cost, effort, and risk. Weights may be applied to cost, effort, or risk variables in the algorithm to tailor the recommendation to the requesting user, based on that user's or enterprise's priorities.

At step 312, migration manager 156 may generate the migration plan for the user based on the comparison. For example, for each capability for which there is an equivalent in the target cloud environment, migration manager 156 may notify the user or enterprise of the equivalent capability in the target cloud environment. For each capability for which there are differences in the target environment, migration manager 156 may be configured to identify a workaround for achieving similar functionality on the target environment, as well as a cost, risk, and/or effort of the workaround. For each capability for which there is no workaround, migration manager 156 may notify the user or enterprise that those capabilities or resources are not able to migrate from the current cloud environment to the target cloud environment.

FIG. 4 illustrates an example graphical user interface (GUI) 400, according to example embodiments. GUI 400 may correspond to a dashboard page that allows a user or an enterprise to view migration assessments. As shown, GUI 400 may include three migration assessments or migration plans: (1) OCI to AWS; (2) Azure to OCI; and (3) AWS to Azure. GUI 400 may further include an indicator related to the risk associated with each migration. For example, although the colors are not shown, GUI 400 can include colors to emphasize the risk associated with each migration. For example, the risk associated with the migration from AWS to Azure may be shown in green; the risk associated with the migration from OCI to AWS may be shown in red; and the risk associated with the migration from Azure to OCI may be shown in red. The colors may communicate a relative risk range using a priority such as migration difficulty or cost. In this example, green indicates low, yellow indicates medium, and red indicates a high amount of risk.

FIG. 5 illustrates an example graphical user interface (GUI) 500, according to example embodiments. GUI 500 may illustrate details related to the AWS to Azure migration illustrated above in conjunction with GUI 400. For example, GUI 500 may represent a snapshot feature. A snapshot may refer to a recording of the state of the cloud computing environment at a given time. As shown, GUI 500 may represent a snapshot associated with a migration from AWS to Azure. GUI 500 may include information such as the number of resources to be migrated, a number of resources that are low risk to migrate, a number of resources that are medium risk to migrate, and a number of resources that are high risk to migrate. Such information may be representative of the time the snapshot was taken. GUI 500 may further include an overall migration risk score. For example, as shown, GUI 500 may indicate that there is an overall low risk of migrating from AWS to Azure.

GUI 500 may further include information such as the overall number of snapshots taken for a given migration assessment, the time and date, number of resources, and risk indication for each snapshot.

FIG. 6 illustrates an example graphical user interface (GUI) 600, according to example embodiments. GUI 600 may illustrate recommendations related to the AWS to Azure migration illustrated above in conjunction with GUI 400 and GUI 500. As shown, GUI 600 may include counts of resources and a recommendation of how to migrate those resources from AWS to Azure. In some embodiments, each resource may include a risk associated with such migration.

FIG. 7 illustrates an example graphical user interface (GUI) 700, according to example embodiments. GUI 700 may illustrate details regarding a selected asset or resource illustrated above in conjunction with GUI 600. GUI 700 may indicate potential cloud offering resources for each asset along with metadata including risk, potential migration issues or incompatibilities, and recommendations.

FIG. 8A illustrates an architecture of computing system 800, according to example embodiments. One or more components of system 800 may be in electrical communication with each other using a bus 805. System 800 may include a processing unit (CPU or processor) 810 and a system bus 805 that couples various system components including the system memory 815, such as read only memory (ROM) 820 and random access memory (RAM) 825, to processor 810. System 800 may include a cache of high-speed memory connected directly with, in close proximity to, or integrated as part of processor 810. System 800 may copy data from memory 815 and/or storage device 830 to cache 812 for quick access by processor 810. In this way, cache 812 may provide a performance boost that avoids processor 810 delays while waiting for data. These and other modules may control or be configured to control processor 810 to perform various actions. Other system memory 815 may be available for use as well. Memory 815 may include multiple different types of memory with different performance characteristics. Processor 810 may include any general purpose processor and a hardware module or software module, such as service 1 832, service 2 834, and service 3 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with the computing system 800, an input device 845 may represent any number of input mechanisms, such as a microphone for speech, a touch-sensitive screen for gesture or graphical input, keyboard, mouse, motion input, speech and so forth. An output device 835 (e.g., display) may also be one or more of a number of output mechanisms known to those of skill in the art. In some instances, multimodal systems may enable a user to provide multiple types of input to communicate with computing system 800. Communications interface 840 may generally govern and manage the user input and system output. There is no restriction on operating on any particular hardware arrangement and therefore the basic features here may easily be substituted for improved hardware or firmware arrangements as they are developed.

Storage device 830 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 may include services 832, 834, and 836 for controlling the processor 810. Other hardware or software modules are contemplated. Storage device 830 may be connected to system bus 805. In one aspect, a hardware module that performs a particular function may include the software component stored in a computer-readable medium in connection with the necessary hardware components, such as processor 810, bus 805, output device 835, and so forth, to carry out the function.

FIG. 8B illustrates a computer system 850 having a chipset architecture that may represent at least a portion of client computing system 102. Computer system 850 may be an example of computer hardware, software, and firmware that may be used to implement the disclosed technology. System 850 may include a processor 855, representative of any number of physically and/or logically distinct resources capable of executing software, firmware, and hardware configured to perform identified computations. Processor 855 may communicate with a chipset 860 that may control input to and output from processor 855. In this example, chipset 860 outputs information to output 865, such as a display, and may read and write information to storage device 870, which may include magnetic media, and solid-state media, for example. Chipset 860 may also read data from and write data to RAM 875. A bridge 880 for interfacing with a variety of user interface components 885 may be provided for interfacing with chipset 860. Such user interface components 885 may include a keyboard, a microphone, touch detection and processing circuitry, a pointing device, such as a mouse, and so on. In general, inputs to system 850 may come from any of a variety of sources, machine generated and/or human generated.

Chipset 860 may also interface with one or more communication interfaces 890 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 855 analyzing data stored in storage device 870 or RAM 875. Further, the machine may receive inputs from a user through user interface components 885 and execute appropriate functions, such as browsing functions by interpreting these inputs using processor 855.

It may be appreciated that example systems 800 and 850 may have more than one processor 810 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method comprising:

deploying a migration manager within a current cloud environment associated with an enterprise;

receiving, by the migration manager, a request to generate a migration plan for migrating resources associated with the current cloud environment to a target cloud environment, wherein the target cloud environment is distinct from and network-disconnected from the current cloud environment;

generating, by the migration manager, a list of resources utilized by the enterprise in the current cloud environment;

augmenting, by the migration manager, the list of resources with metadata comprising a set of descriptive tags generated by the migration manager based on signatures indicative of cloud capabilities used by the resources during deployment and execution;

comparing, by the migration manager, the augmented list of resources to a capability matrix maintained by the migration manager for a plurality of target cloud environments, the capability matrix indicating, for each capability, whether the capability is available in a given target cloud environment as a native capability, is available in the given target cloud environment as a defined workaround, or is unavailable in the given target cloud environment; and based on the comparing, generating, by the migration manager, the migration plan for migrating the resources from the current cloud environment to the target cloud environment, the migration plan comprising a cost, risk, and/or effort for migrating each resource to the target cloud environment.

2. The method of claim 1, wherein deploying the migration manager within the current cloud environment associated with the enterprise comprises:

provisioning a container comprising the migration manager in the current cloud environment.

3. The method of claim 2, further comprising:

granting the migration manager access to the resources associated with the enterprise in the current cloud environment.

4. The method of claim 2, further comprising:

assigning a public internet protocol address and domain name system to the container.

5. The method of claim 1, wherein receiving, by the migration manager, the request to generate the migration plan for migrating the resources associated with the current cloud environment to the target cloud environment comprises:

receiving preference information that dictates weights to be applied during the comparing, the preference information comprising at least one of cost, effort, and risk.

6. The method of claim 1, wherein comparing, by the migration manager, the augmented list of resources to the capability matrix maintained by the migration manager for the plurality of target cloud environments, the capability matrix indicating, for each capability, whether the capability is available in a given target cloud environment as a native capability, is available in the given target cloud environment as a defined workaround, or is unavailable in the given target cloud environment comprises:

applying an algorithm to the augmented list of resources and the capability matrix to determine a similarity between a first capability of the current cloud environment and a second capability of the target cloud environment.

7. The method of claim 1, wherein generating, by the migration manager, the migration plan for migrating the resources from the current cloud environment to the target cloud environment comprises:

identifying a first capability in the current cloud environment that has a matching second capability in the target cloud environment; and generating a summary describing an equivalence between the first capability and the matching second capability.

8. The method of claim 1, wherein generating, by the migration manager, the migration plan for migrating the resources from the current cloud environment to the target cloud environment comprises:

identifying a first capability in the current cloud environment that does not have a matching second capability in the target cloud environment; and generating a workaround for achieving a similar capability in the target cloud environment.

9. The method of claim 1, wherein generating, by the migration manager, the migration plan for migrating the resources from the current cloud environment to the target cloud environment comprises:

identifying a first capability in the current cloud environment that does not have a matching second capability in the target cloud environment;

determining that there is not a workaround for achieving a similar capability in the target cloud environment; and based on the determining, flagging a subset of the resources associated with the first capability as not being able to be migrated to the target cloud environment.

10. A system, comprising:

a processor; and a memory having programming instructions stored thereon, which, when executed by the processor, causes the system to perform operations comprising:

deploying a migration manager within a current cloud environment associated with an enterprise;

receiving, by the migration manager, a request to generate a migration plan for migrating resources associated with the current cloud environment to a target cloud environment, wherein the target cloud environment is distinct from and network-disconnected from the current cloud environment;

generating, by the migration manager, a list of resources utilized by the enterprise in the current cloud environment;

augmenting, by the migration manager, the list of resources with metadata comprising a set of descriptive tags generated by the migration manager based on signatures indicative of cloud capabilities used by the resources during deployment and execution;

comparing, by the migration manager, the augmented list of resources to a capability matrix maintained by the migration manager for a plurality of target cloud environments, the capability matrix indicating, for each capability, whether the capability is available in a given target cloud environment as a native capability, is available in the given target cloud environment as a defined workaround, or is unavailable in the given target cloud environment; and based on the comparing, generating, by the migration manager, the migration plan for migrating the resources from the current cloud environment to the target cloud environment, the migration plan comprising a cost, risk, and/or effort for migrating each resource to the target cloud environment.

11. The system of claim 10, wherein deploying the migration manager within the current cloud environment associated with the enterprise comprises:

provisioning a container comprising the migration manager in the current cloud environment.

12. The system of claim 11, further comprising:

granting the migration manager access to the resources associated with the enterprise in the current cloud environment.

13. The system of claim 11, further comprising:

assigning a public internet protocol address and domain name system to the container.

14. The system of claim 10, wherein receiving, by the migration manager, the request to generate the migration plan for migrating the resources associated with the current cloud environment to the target cloud environment comprises:

receiving preference information that dictates weights to be applied during the comparing, the preference information comprising at least one of cost, effort, and risk.

15. The system of claim 10, wherein comparing, by the migration manager, the augmented list of resources to the capability matrix maintained by the migration manager for the plurality of target cloud environments, the capability matrix indicating, for each capability, whether the capability is available in a given target cloud environment as a native capability, is available in the given target cloud environment as a defined workaround, or is unavailable in the given target cloud environment comprises:

applying an algorithm to the augmented list of resources and the capability matrix to determine a similarity between a first capability of the current cloud environment and a second capability of the target cloud environment.

16. The system of claim 10, wherein generating, by the migration manager, the migration plan for migrating the resources from the current cloud environment to the target cloud environment comprises:

identifying a first capability in the current cloud environment that has a matching second capability in the target cloud environment; and generating a summary describing an equivalence between the first capability and the matching second capability.

17. The system of claim 10, wherein generating, by the migration manager, the migration plan for migrating the resources from the current cloud environment to the target cloud environment comprises:

identifying a first capability in the current cloud environment that does not have a matching second capability in the target cloud environment; and generating a workaround for achieving a similar capability in the target cloud environment.

18. The system of claim 10, wherein generating, by the migration manager, the migration plan for migrating the resources from the current cloud environment to the target cloud environment comprises:

identifying a first capability in the current cloud environment that does not have a matching second capability in the target cloud environment;

determining that there is not a workaround for achieving a similar capability in the target cloud environment; and based on the determining, flagging a subset of the resources associated with the first capability as not being able to be migrated to the target cloud environment.

19. A non-transitory computer readable medium comprising one or more sequences of instructions, which, when executed by one or more processors, causes a computing system to perform operations comprising:

deploying a migration manager within a current cloud environment associated with an enterprise;

receiving, by the migration manager, a request to generate a migration plan for migrating resources associated with the current cloud environment to a target cloud environment, wherein the target cloud environment is distinct from and network-disconnected from the current cloud environment;

generating, by the migration manager, a list of resources utilized by the enterprise in the current cloud environment;

augmenting, by the migration manager, the list of resources with metadata comprising a set of descriptive tags generated by the migration manager based on signatures indicative of cloud capabilities used by the resources during deployment and execution;

comparing, by the migration manager, the augmented list of resources to a capability matrix maintained by the migration manager for a plurality of target cloud environments, the capability matrix indicating, for each capability, whether the capability is available in a given target cloud environment as a native capability, is available in the given target cloud environment as a defined workaround, or is unavailable in the given target cloud environment; and based on the comparing, generating, by the migration manager, the migration plan for migrating the resources from the current cloud environment to the target cloud environment, the migration plan comprising a cost, risk, and/or effort for migrating each resource to the target cloud environment.

20. The non-transitory computer readable medium of claim 19, wherein deploying the migration manager within the current cloud environment associated with the enterprise comprises:

provisioning a container comprising the migration manager in the current cloud environment.

* * * * *